United States Patent [19]
Chen

[11] Patent Number: 6,032,547
[45] Date of Patent: Mar. 7, 2000

[54] SWAYING MECHANISM FOR ELECTRICAL APPLIANCES

[76] Inventor: Cheng-Ho Chen, No. 12, Lane 296, Chung-Ching N. Rd. Sec. 3, Taipei, Taiwan

[21] Appl. No.: 09/065,501

[22] Filed: Apr. 24, 1998

[51] Int. Cl.[7] .............................. F16H 21/42; F16D 7/04
[52] U.S. Cl. .............................. 74/42; 74/527; 403/319; 403/359.5; 416/100
[58] Field of Search ................................ 74/42, 43, 527; 464/37; 403/359.5, 319; 416/100

[56] References Cited

U.S. PATENT DOCUMENTS

| | | | |
|---|---|---|---|
| 2,258,817 | 10/1941 | Shoup | 464/37 X |
| 2,517,415 | 8/1950 | Preston | 464/37 X |
| 2,711,635 | 6/1955 | Rockwell | 464/37 X |
| 3,335,580 | 8/1967 | Simpson, Jr. | 464/37 X |
| 5,000,721 | 3/1991 | Williams | 464/37 X |

Primary Examiner—Allan D. Herrmann
Attorney, Agent, or Firm—Ware, Fressola, Van Der Sluys & Adolphson LLP

[57] ABSTRACT

A swaying mechanism is provided, which can be used on various kinds of electrical appliances that need to be swayed during use, such as electric fans, dryers, and heaters. The swaying mechanism can protect the motor from being burned out when the swaying motion is abruptly stopped by foreign objects, and also can allow the electric cable to be always fixed in position all the time during the swaying motion such that the cable would not wear out. The swaying mechanism includes a synchronization motor; a first elbow member coupled to the motor shaft; a linkage bar for providing a reciprocating force when the motor rotates; a second elbow member which can be swayed by the reciprocating force from the linkage bar; and a toothed section on which the second elbow member is swayably mounted. This swaying mechanism allows a coupling action between the teeth of the toothed section and the toothed portions of the second elbow member, thus allowing the teeth of the toothed section to skip over the toothed portion on the second elbow member when the swaying motion is abruptly stopped, thus protecting the synchronization motor from being burned out under such a condition. The swaying mechanism also allows the user to easily adjust the angular range of the swaying motion.

6 Claims, 7 Drawing Sheets

SWAYING MECHANISM FOR ELECTRICAL APPLIANCES

BACKGROUND OF THE INVENTION

1. Field of the Invention

This invention is related to swaying mechanisms, and more particularly, to a swaying mechanism that can be used on various kinds of electrical appliances that need to be swayed during use, such as electric fans, dryers, heaters, and related appliances.

2. Description of Related Art

Electric fans are typically swayable so as to allow the air stream to blow in various directions. Conventionally, there are two types of swaying mechanisms that are used on electric fans. In the first type, the mechanical power used to produce the swaying motion is obtained directly from the motor shaft used to rotate the fan. In the second type, a separate motor is used to drive the swaying mechanism. The first type is considerably more complex in structure and is thus costly to manufacture. Moreover, during the swaying motion, if the swaying motion is impeded by any external objects, the transmission gear set in the swaying mechanism can be easily damaged. The second type, on the contrary, is less complex in structure and is low in manufacturing cost. Therefore, the second type is more widely utilized than the first type. However, the second type nonetheless has some drawbacks. The structure of the second type of swaying mechanism is illustratively depicted in the following with reference to FIG. 7.

As shown in FIG. 7, the conventional swaying mechanism is encased in a casing 100 and includes a large gear 101 formed with a toothed portion 103 on a selected section of the perimeter thereof. A pair of stoppers 102, 104 are formed on both ends of the toothed portion 103 of the large gear 101. A small gear 106 is meshed to the toothed portion 103 of the large gear 101, and is axially affixed by means of a screw 105 to the rotating shaft 107 of a synchronization motor 108. When the shaft 107 of the synchronization motor 108 rotates in the clockwise direction (in reference to the view of FIG. 7), it will drive the small gear 106 to rotate also in the clockwise direction, thereby driving the large gear 101 to rotate in the counterclockwise direction with a reduced speed. This causes the swaying mechanism to sway in the counterclockwise direction. Until the second stopper 104 reaches the small gear 106, the swaying motion will be stopped. The synchronization motor 108 is of the type that can change its rotating direction when the shaft 107 is abruptly stopped. Therefore, when the swaying motion is stopped by the second stopper 104, the synchronization motor 108 will reverse the rotational direction of the shaft 107 to the clockwise direction, thereby causing the large gear 101 to rotate in the counterclockwise direction. This causes the swaying motion to sway in the clockwise direction. Until the first stopper 102 reaches the small gear 106, the swaying motion will be stopped. At this point, the synchronization motor 108 will reverse the rotational direction of the shaft 107 to the counterclockwise direction, thereby causing the large gear 101 to rotate back in the clockwise direction. As a result of the foregoing mechanism, the swaying mechanism can sway in the angular range defined by the toothed portion 103 of the large gear 101 bounded by the two stoppers 102, 104.

One drawback to the foregoing conventional swaying mechanism, however, is that the synchronization motor 108 would have a considerably reduced life of operation due to being frequently subjected to a large instant current each time the swaying motion is abruptly stopped by either of the stoppers 102, 104. In practice, it has been found that the swaying mechanism would fail after a short period of use due to the synchronization motor being burned out. Moreover, since the electrical cables connected to the swaying mechanism would sway along with the swaying motion, the insulating wrapping of the cables can be easily worn out, which could easily cause a short-circuit that would cause fire or other severe damage to the swaying mechanism.

SUMMARY OF THE INVENTION

It is therefore an objective of the present invention to provide a swaying mechanism for electrical appliances, which can protect the synchronization motor from being burned out when the swaying motion is abruptly stopped by foreign objects.

It is another objective of the present invention to provide a swaying mechanism for electrical appliances, which allows the electric cable to be always fixed in position all the time during the swaying motion such that the cable would not wear out.

It is still another objective of the present invention to provide a swaying mechanism for electrical appliances, which allows the user to easily adjust the angular range of the swaying motion.

In accordance with the foregoing and other objectives of the present invention, a new swaying mechanism is provided. The swaying mechanism of the invention includes the following constituent parts: a synchronization motor having a rotating shaft; a first elbow member coupled to the shaft of the synchronization motor; a linkage bar, coupled to the first elbow member, for providing a reciprocating force when the first elbow member is being rotated by the synchronization motor; a second elbow member coupled to the linkage bar, the second elbow member being swayed by the reciprocating force from the linkage bar; and a toothed section on which the second elbow member is swayably mounted.

In the foregoing swaying mechanism, the second elbow member is formed with a coupling axis, a coupling hole, a pair of protruded portions, and a plurality of toothed portions formed on the sidewall of the coupling hole; and when the coupling hole of the second elbow member is axially coupled to the toothed section, the protruded portions cause a flexible coupling effect between the teeth of the toothed section and the toothed portions of the second elbow member, allowing the toothed section to skip over the toothed portion on the sidewall of the coupling hole of the second elbow member when the swaying motion is abruptly stopped, thus protecting the synchronization motor from being burned out when such a condition occurs.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
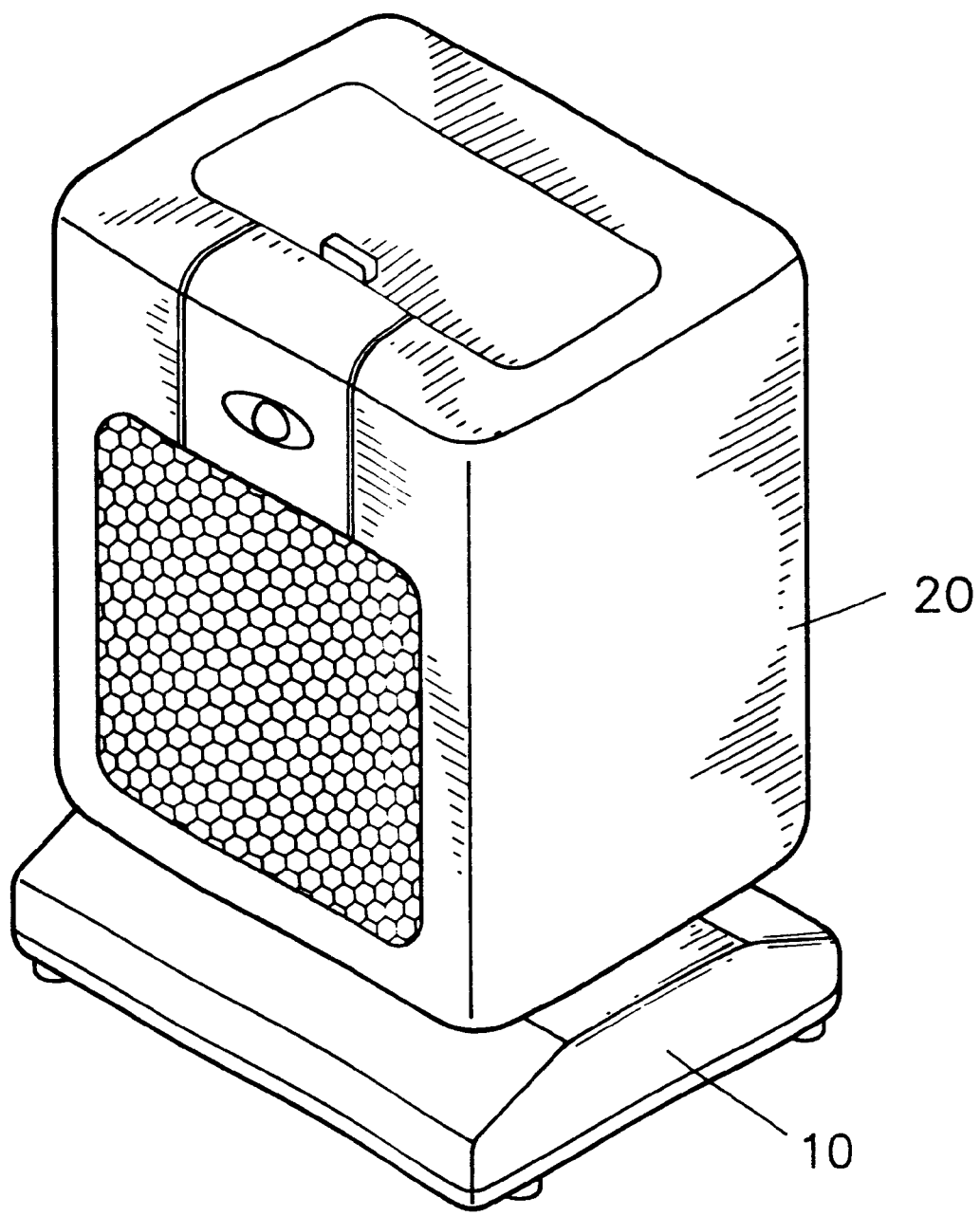
FIG. 1 is a perspective view showing the outer appearance of an electrical appliance which utilities the swaying mechanism of the invention.
Figure 2:
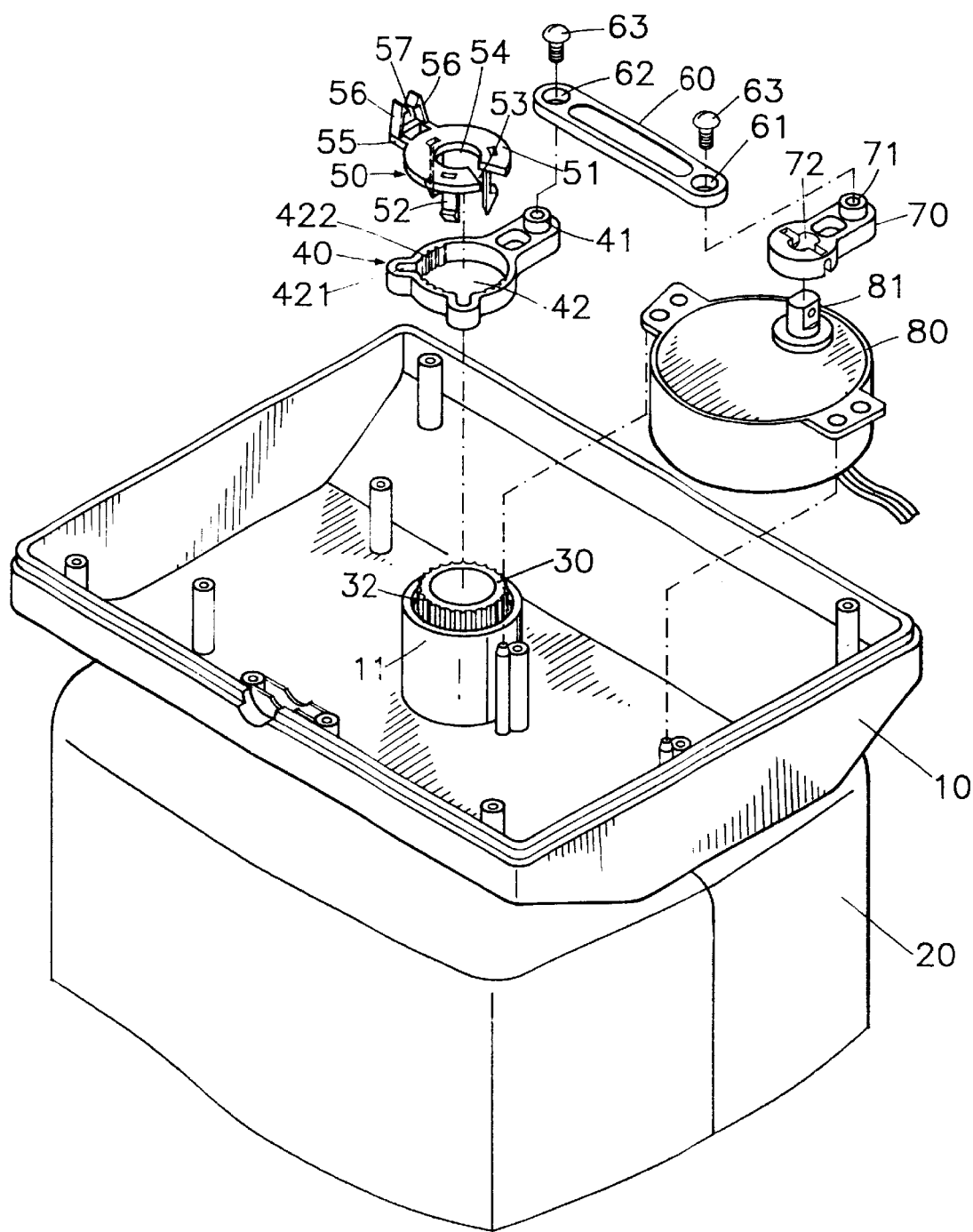
FIG. 2 is an exploded perspective view of the swaying mechanism of the invention.
Figure 3:
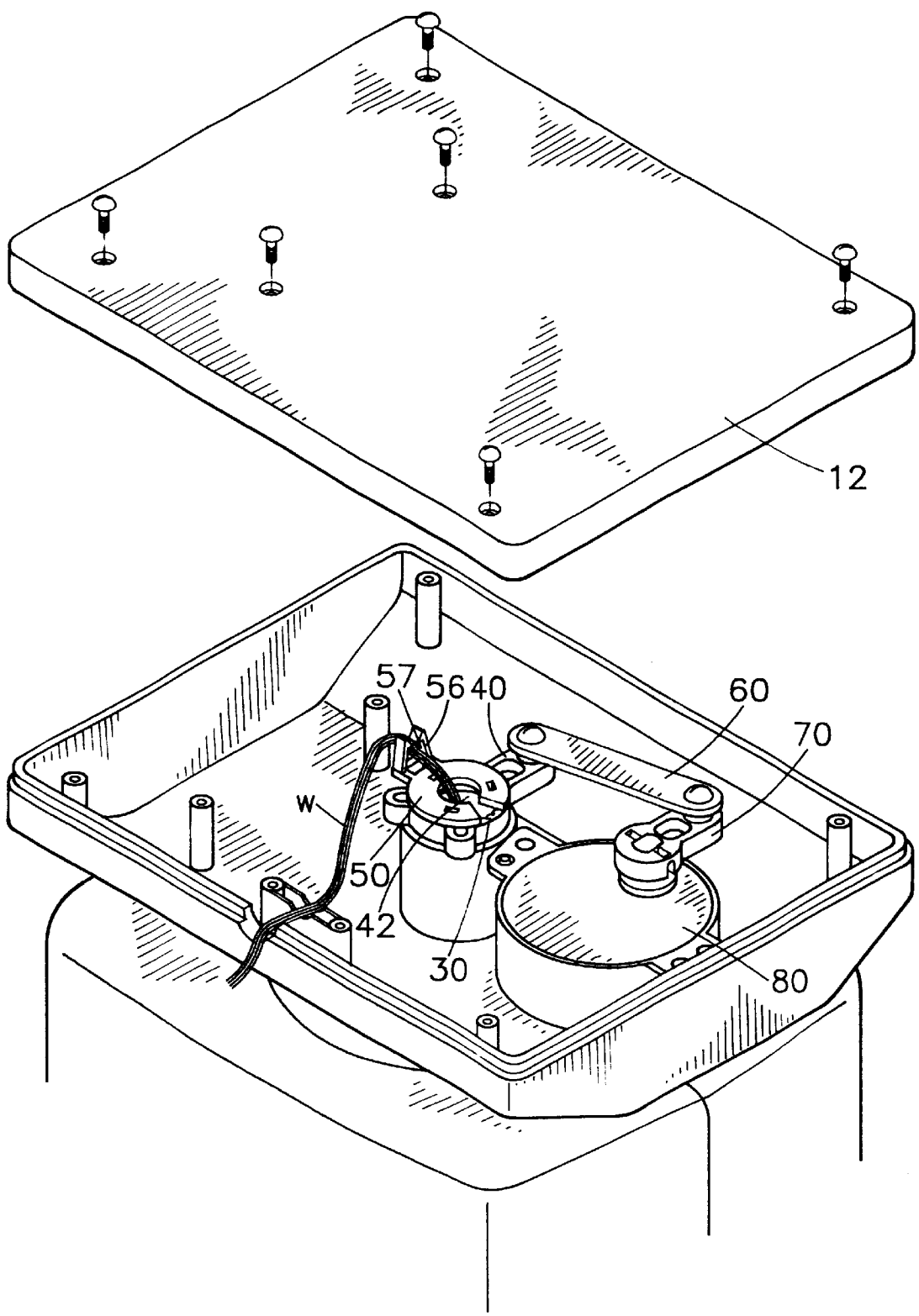
FIG. 3 shows the same of FIG. 2 except when the constituent parts are assembled.

FIG. 1 is a perspective view showing the outer appearance of an electrical appliance which utilizes the swaying mechanism of the invention. As shown, the electric appliance is encased in a casing 20 which is swayably mounted on a base 10. The mechanical parts of the swaying mechanism of the invention are encased in the base 10. FIGS. 2–3 shows the detailed inside structure of the swaying mechanism of the invention, in which the electrical appliance is turned upside down to show the mechanical structure of the swaying mechanism of the invention which is encased in the base 10.

Figure 5:
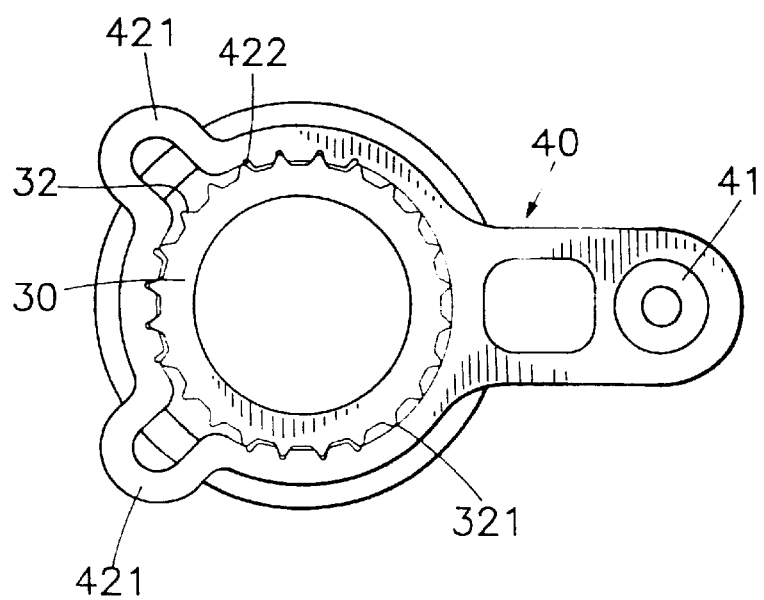
FIG. 5 is a schematic top view showing the coupling of the second elbow member to the toothed section in the swaying mechanism of the invention.
Figure 6A:
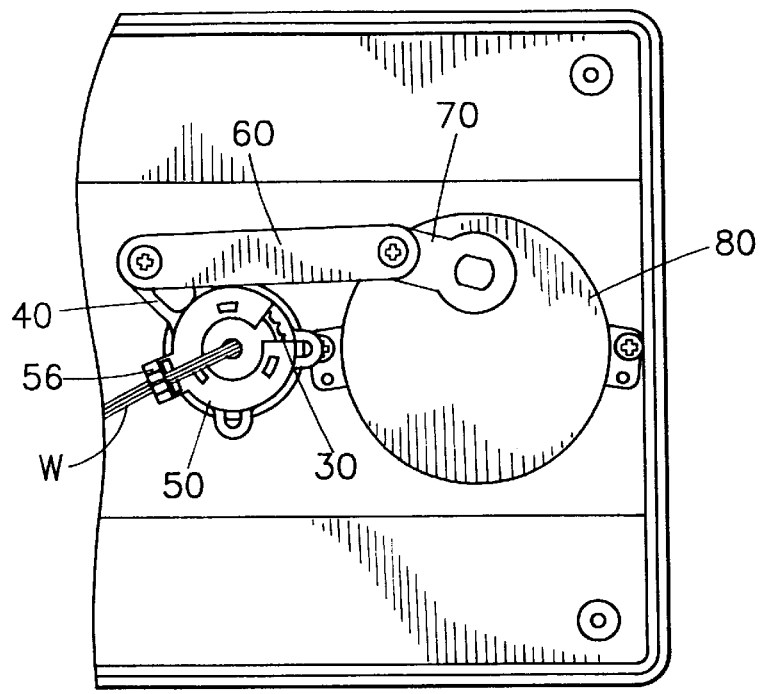
FIGS. 6A–6D are schematic top views used to depict the operation of the swaying mechanism of the invention.
Figure 6B:
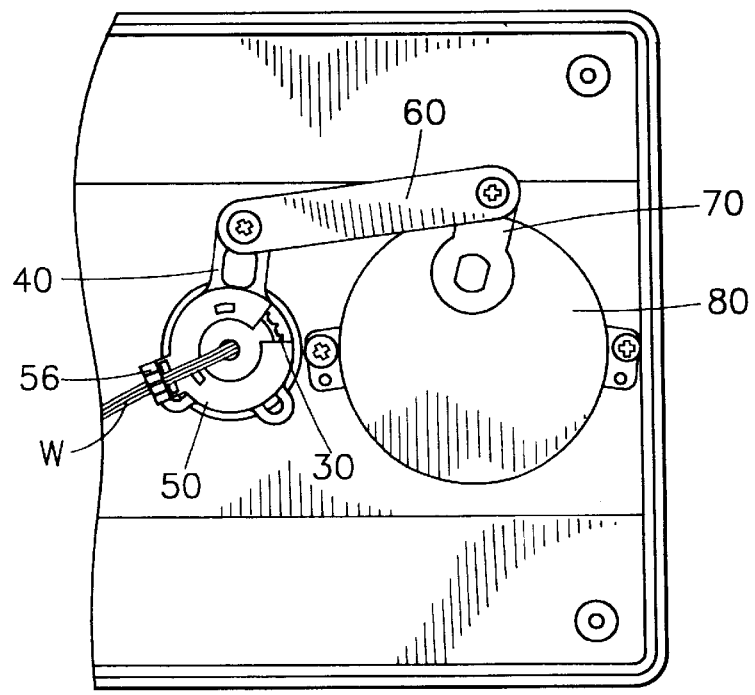
Figure 6C:
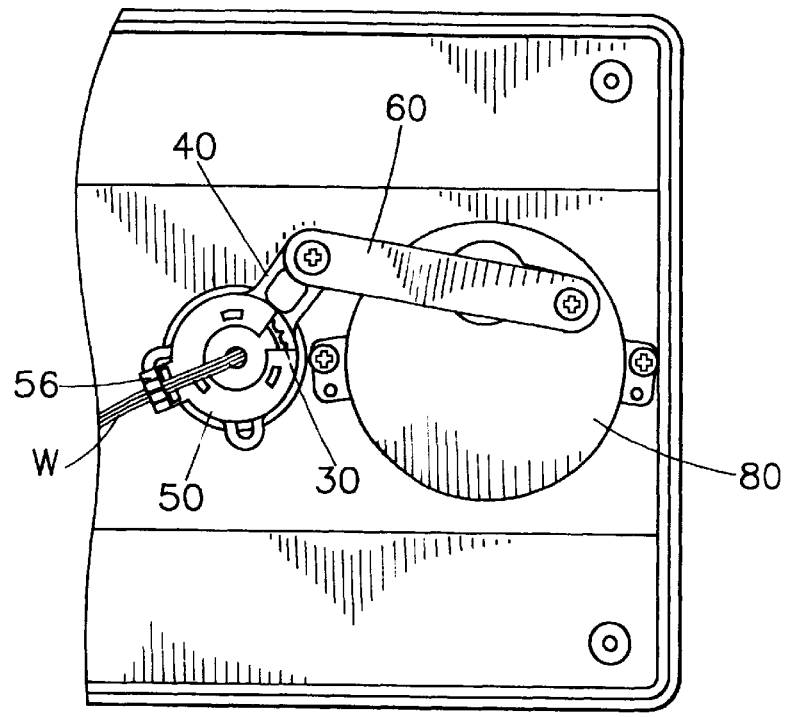
Figure 6D:
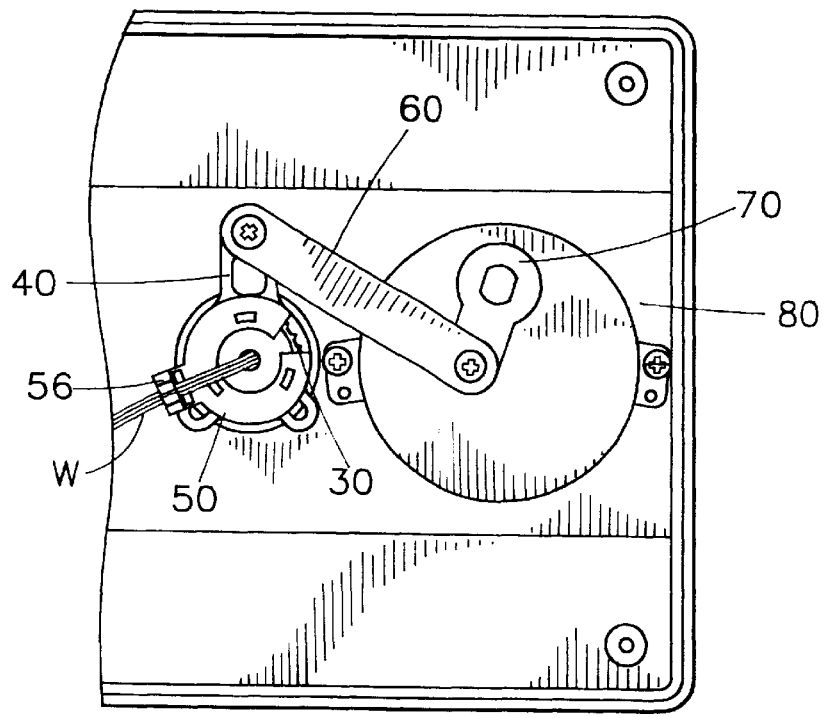
Figure 7:
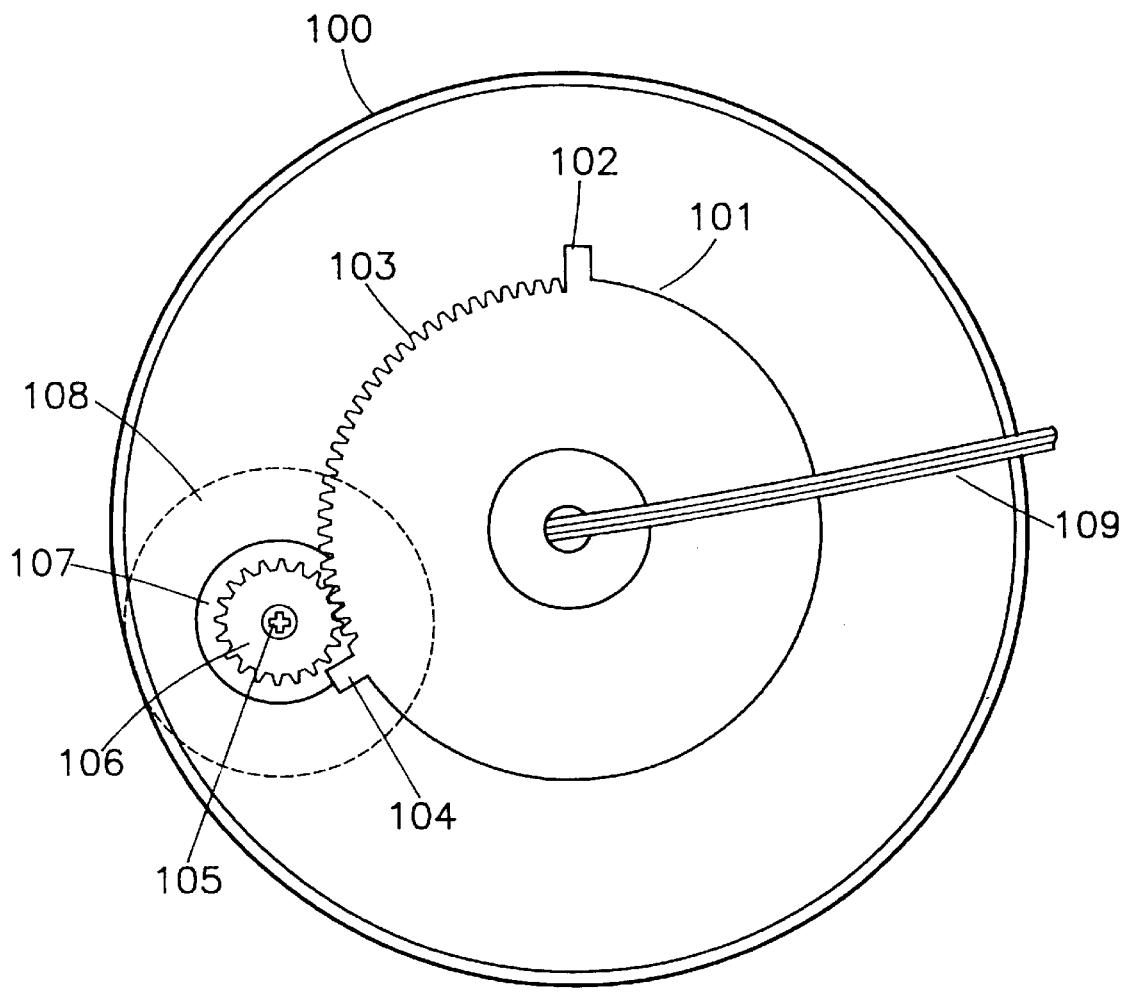
FIG. 7 is a schematic diagram of a conventional swaying mechanism which is used to sway an electric fan.

As shown in FIGS. 2–3, the swaying mechanism of the invention includes a small synchronization motor 80 having a rotating shaft 81, a first elbow member 70, a linkage bar 60, a fastening member 50, a second elbow member 40, and a hollowed tubular part 30. The first elbow member 70 is formed with a coupling hole 72 at one end and a coupling axis 71 at the other end. The linkage bar 60 is formed with a first coupling hole 61 at one end and a second coupling hole 62 at the other end. The second elbow member 40 is formed with a coupling axis 41, a coupling hole 42, a pair of protruded portions 421, a plurality of toothed portions 422 (three in this embodiment) formed on the sidewall of the coupling hole 42. The coupling hole 72 of the first elbow member 70 is axially coupled to the shaft 81 of the synchronization motor 80, while the coupling axis 71 thereof is rotatably coupled by means of a screw 63 to the first coupling hole 61 of the linkage bar 60. The second coupling hole 62 is also rotatably coupled by means of another screw 63 to the coupling axis 41. The coupling hole 42 of the second elbow member 40 is axially coupled to a toothed section 32, with the toothed portion 422 being meshing to the toothed section 32 As shown in FIG. 5, when the coupling hole 42 of the second elbow member 40 is axially coupled to the toothed section 32 on the tubular part 30, the protruded portions 421 on the wall of the coupling hole 42 can allow a flexible coupling effect between the teeth 321 of the toothed section 32 on the tubular part 30 and the toothed portion 422 on the inner wall of the coupling hole 42 in the second elbow member 40. This allows the teeth of the toothed section 32 to skip over the toothed portion 422 when the swaying motion is suddenly impeded by a foreign object. As a result, the synchronization motor 80 can be protected from being burned out when such a condition occurs. Moreover, the user can arbitrarily adjust the angular range of the swaying motion without having to move the entire electrical appliance.

Figure 4:
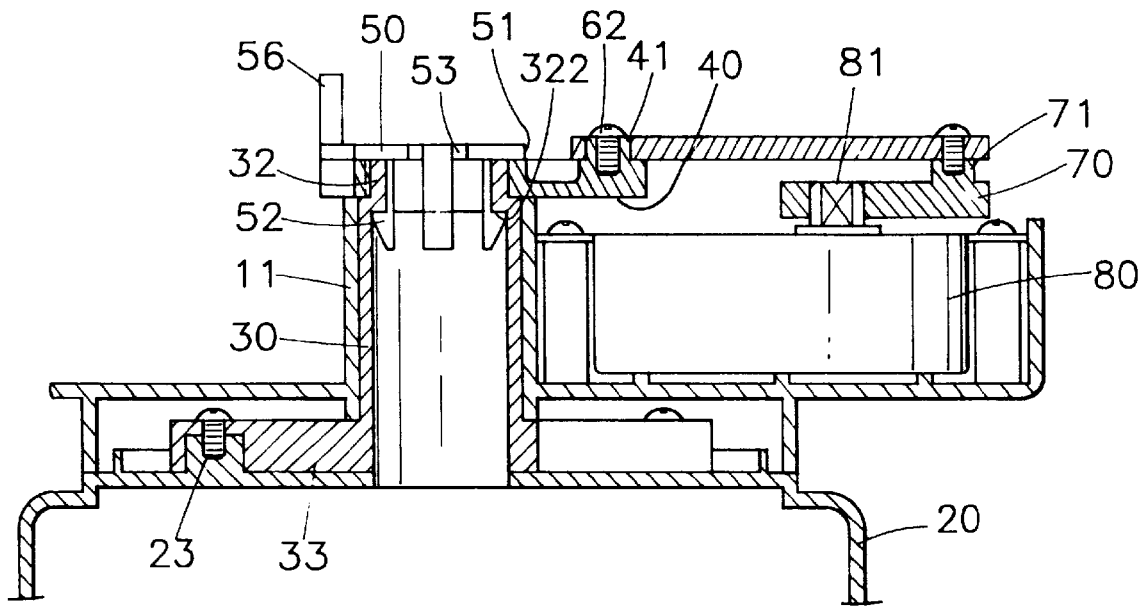
FIG. 4 is a schematic sectional diagram of the swaying mechanism of the invention.

The operation of the swaying mechanism of the invention is described in the following with reference to FIGS. 6A–6D. As shown, when the synchronization motor 80 is rotating, it drives the first elbow member 70 to rotate continuously in full cycles about the shaft 81. This causes the linkage bar 60 to reciprocate and thereby sway the second elbow member 40 in a preset angular range, for example 45°. This causes the tubular part 30 and the casing 20 to be also driven to sway within the same angular range defined by the second elbow member 40. Another charac- teristic part of the invention is the provision of the fastening member 50 which is used to secure the coupling of the coupling hole 42 of the second elbow member 40 to the toothed section 32 of the tubular part 30. As shown in FIG. 2 and FIG. 4, the fastening member 50 is formed with a substantially C-shaped disk 51 having a gap 53, a plurality of hooked portions 52 (three in this embodiment), a center hole 54, a support portion 55, and a pair of clasping hooks 56. As shown in FIG. 4, the hooked portions 52 can be hooked to the top portion of the relatively larger diameter portion 322 of the toothed section 32 on the tubular part 30, allowing the second elbow member 40 and the tubular part 30 to be rotatably and securely fixed in position by the fastening member 50. The provision of the gap 53 allows the C-shaped disk 51 of the fastening member 50 to be mechanically flexible. Thus, the technician can manually restrict the C-shaped disk 51 when it is to be removed from the tubular part 30 to dismount the second elbow member 40. Further, the support portion 55 is formed with a pair of clasping hooks 56 between which a space 57 for the clasping purpose is defined. The electric cable W (see FIG. 3) can be wired in such a manner that it first passes through the coupling hole 42 and the tubular part 30, then clasped in the space 57 between the clasping hooks 56, and then extended to the outside of the base 10 for connection to an electric outlet (not shown). Further, the fastening member 50 is rotatably mounted on the tubular part 30. Therefore, when the tubular part 30 is being swayed, the fastening member 50 will be still fixed in position, allowing the cable W arranged thereon to be also fixed in position without being moved by the swaying motion of the tubular part 30. This allows the cable W to be always fixed in position all the time during the swaying motion. Therefore, this eliminates the drawback of the wearing out of the cable due to swaying motion as in the prior art. The swaying mechanism of the invention is therefore safer to use. To disassemble the swaying mechanism, the technician needs first to dismount the fastening member 50 by manually constricting the C-shaped disk 51 toward the gap 53, and then separate the second elbow member 40 from the tubular part 30.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A swaying mechanism, which comprises:

a synchronization motor having a rotating shaft;

a first elbow member coupled to the shaft of the synchronization motor;

a linkage bar, coupled to the first elbow member, for providing a reciprocating force when the first elbow member is being rotated by the synchronization motor;

a second elbow member coupled to the linkage bar, the second elbow member being swayed by the reciprocating force from the linkage bar; and a toothed section on which the second elbow member is swayably mounted, wherein the second elbow member is formed with a coupling axis, a coupling hole, a pair of protruded portions, and a plurality of toothed portions formed on the sidewall of the coupling hole; and when the coupling hole of the second elbow member is axially coupled to the toothed section, the protruded portions cause a flexible coupling affect between the teeth of the toothed section and the toothed portions of the second elbow member, allowing the toothed section to skip over the toothed portion on the sidewall of the coupling hole of the second elbow member when the swaying motion is abruptly stopped, thus protecting the synchronization motor from being burned out when such a condition occurs.

2. The swaying mechanism of claim 1, further comprising:

a fastening member for securing the second elbow member in position on the toothed section, the fastening member being formed with a substantially C-shaped disk having a gap, a pair of clasping hooks; a plurality of hooked portions, a center hole, and a support portion; wherein the hooked portions can be hooked to the teeth of the toothed section, allowing the second elbow member and the toothed section to be rotatably and securely fixed in position by the fastening member.

3. The swaying mechanism of claim 1, wherein the second elbow member is formed with three toothed portions at predetermined intervals on the sidewall of the coupling hole.

4. The swaying mechanism of claim 1, wherein the second elbow member is formed with two protruded portions to provide the flexible coupling effect.

5. The swaying mechanism of claim 2, further comprising:

an electric cable which is wired in such a manner that it first passes through the coupling hole and the hollowed inside of the toothed section, then clasped in a space between the clasping hooks of the fastening member, and then extended to the outside of the swaying mechanism for electrical connection.

6. The swaying mechanism of claim 1, wherein the toothed section is mounted in a sleeve.

* * * * *